(12) United States Patent
Chen

(10) Patent No.: US 10,488,513 B2
(45) Date of Patent: Nov. 26, 2019

(54) UNMANNED AERIAL VEHICLE, METHOD AND APPARATUS FOR FILTERING IN RANGING OF THE SAME, AND RANGING METHOD

(71) Applicant: GUANGZHOU XAIRCRAFT TECHNOLOGY CO., LTD., Guangzhou (CN)

(72) Inventor: Yousheng Chen, Guangzhou (CN)

(73) Assignee: GUANGZHOU XAIRCRAFT TECHNOLOGY CO. LTD., Guangzhou (CN)

(*) Notice: Subject to any disclaimer, the term of this patent is extended or adjusted under 35 U.S.C. 154(b) by 262 days.

(21) Appl. No.: 15/610,763

(22) Filed: Jun. 1, 2017

(65) Prior Publication Data
US 2017/0269207 A1 Sep. 21, 2017

Related U.S. Application Data

(63) Continuation of application No. PCT/CN2016/102726, filed on Oct. 20, 2016.

(30) Foreign Application Priority Data

Oct. 22, 2015 (CN) .......................... 2015 1 0698196

(51) Int. Cl.
*G01S 15/00* (2006.01)
*G01S 15/08* (2006.01)
(Continued)

(52) U.S. Cl.
CPC ............ *G01S 15/08* (2013.01); *B64C 39/024* (2013.01); *G01C 21/12* (2013.01); *G01S 15/60* (2013.01); *B64C 2201/141* (2013.01)

(58) Field of Classification Search
CPC .......... G01S 15/08; G01S 15/60; G01S 15/93; B64C 39/024; B64C 2201/141; G01C 21/12
See application file for complete search history.

(56) References Cited

U.S. PATENT DOCUMENTS

| 6,043,867 A | 3/2000 | Saban | |
| 7,505,865 B2 * | 3/2009 | Ohkubo | G01C 21/28 340/425.5 |

(Continued)

FOREIGN PATENT DOCUMENTS

| CN | 102798857 A | 11/2012 |
| CN | 103365295 | 10/2013 |

(Continued)

OTHER PUBLICATIONS

Hudson, Christopher R. and Leighanne Hsu. "Simplistic Sonar based SLAM for low-cost Unmanned Aerial Quadrocopter systems." (2013) (Year: 2013).*

(Continued)

*Primary Examiner* — Krystine E Breier
(74) *Attorney, Agent, or Firm* — Hodgson Russ LLP

(57) ABSTRACT

A method for filtering in ranging of a UAV is provided, which is based on a characteristic that velocities of the UAV change continuously during a moving process. A current velocity of the UAV is obtained via seeking difference of distances measured by the sensor, then a variance of continuous velocities is calculated and it is determined whether a current distance is valid according to the variance. The general process of the method is as follows. First, initial distances measured by the sonar sensor are acquired, secondly, it is determined whether a new distance is valid according to the initial distances, if the new distance satisfies a curtain condition, the new distance is considered to be valid and the initial distances are updated; if the new (Continued)

distance does not satisfy the curtain condition, a distance is estimated and used as the current distance and the initial distances are maintained.

18 Claims, 8 Drawing Sheets

(51) Int. Cl.
*B64C 39/02* (2006.01)
*G01C 21/12* (2006.01)
*G01S 15/60* (2006.01)

(56) References Cited

U.S. PATENT DOCUMENTS

| | | | | |
|---|---|---|---|---|
| 7,768,873 | B2* | 8/2010 | Scoca | G01S 15/60 |
| | | | | 367/89 |
| 8,583,915 | B1* | 11/2013 | Huang | H04L 63/0869 |
| | | | | 713/155 |
| 9,250,081 | B2* | 2/2016 | Gutmann | G05D 1/0231 |
| 9,399,503 | B2* | 7/2016 | Rikoski | B22D 31/00 |
| 9,710,925 | B2* | 7/2017 | Held | G06T 7/277 |
| 9,759,561 | B2* | 9/2017 | Young | G01C 17/38 |
| 9,766,336 | B2* | 9/2017 | Gupta | G01S 17/936 |
| 9,832,749 | B2* | 11/2017 | Schlesinger | H04W 64/00 |
| 2003/0067351 | A1 | 4/2003 | Sridhar | |
| 2005/0114023 | A1* | 5/2005 | Williamson | G01C 21/165 |
| | | | | 701/472 |
| 2011/0311099 | A1 | 12/2011 | Derbanne | |
| 2017/0206907 | A1* | 7/2017 | Wang | G10L 19/008 |

FOREIGN PATENT DOCUMENTS

| | | |
|---|---|---|
| CN | 103365297 A | 10/2013 |
| CN | 104567799 A | 4/2015 |
| CN | 104820434 A | 8/2015 |
| CN | 105223575 A | 1/2016 |
| JP | H0527031 | 2/1993 |
| JP | 2015024705 | 2/2015 |

OTHER PUBLICATIONS

ISA/CN, International Search Report for PCT/CN2016/102726, dated Jan. 18, 2017.

JPO, Office Action for JP Application No. 2017535766, dated Aug. 15, 2018.

EPO, Office Action for EP Application No. 16856909, dated May 2, 2019.

* cited by examiner

UNMANNED AERIAL VEHICLE, METHOD AND APPARATUS FOR FILTERING IN RANGING OF THE SAME, AND RANGING METHOD

CROSS-REFERENCE TO RELATED APPLICATIONS

This application is a continuation of International Application No. PCT/CN2016/102726, filed on Oct. 20, 2016, which is based on and claims priority to Chinese Patent Application No. 201510698196.0, filed on Oct. 22, 2015, the entire contents of which are incorporated herein by reference.

FIELD

The present disclosure relates to the technical field of unmanned aerial vehicles (UAVs for short), and more particularly, to an unmanned aerial vehicle, a method for filtering in ranging of a UAV, a ranging method based on aforesaid method, and an apparatus for filtering in ranging of a UAV.

BACKGROUND

To realize a low-altitude (especially near-ground) autonomous flight of an unmanned aerial vehicle (UAV for short), both an altitude of the UAV and a height of the UAV relative to the ground are needed to know. The height of the UAV relative to the ground may be obtained by a sonar ranging, a laser ranging, a microwave radar ranging and a machine vision measuring, etc.

The sonar ranging is not susceptible to light. However, the sonar ranging used in the related art is in an environment totally different from the UAV, for example, a high-frequency vibration of a fuselage of the UAV caused by high speed rotation of a screw propeller, airflow disturbance caused by rotation of the screw propeller, rapid and repeated tilt changes of the attitude of the UAV during flight, unstable power supply caused by high speed rotation of the screw propeller, and the complicated ground environment during an air-to-ground ranging process of the UAV. These complex situations may bring serious noise into a UAV airborne sonar ranging.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Figure 1:
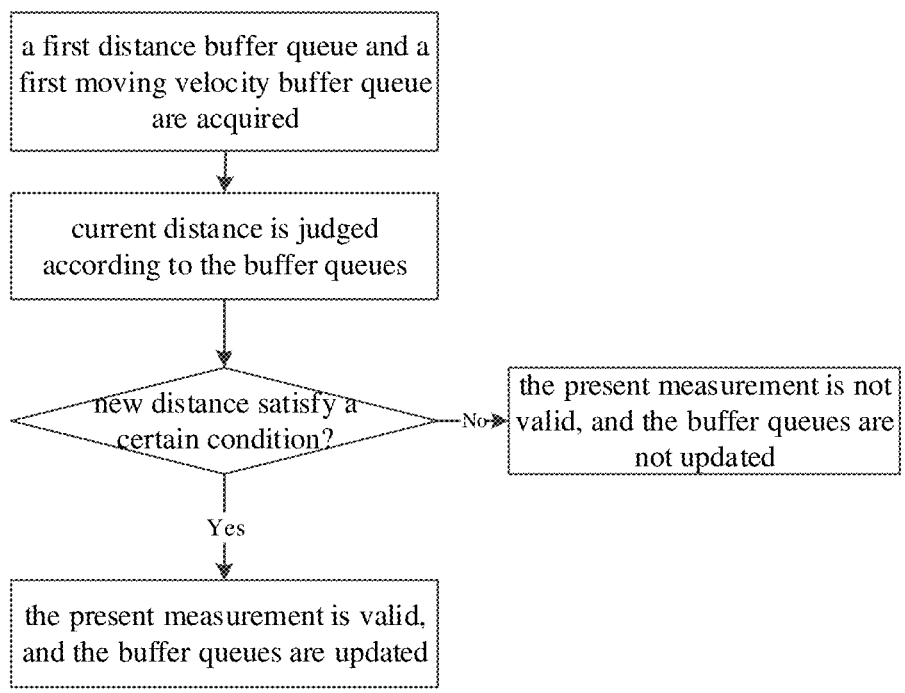
FIG. 1 is an overall flow chart of a method for filtering in ranging of a UAV according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

A method for filtering in ranging of a UAV, a UAV, and a ranging method based on aforesaid method for filtering in ranging of a UAV according to embodiments of the present disclosure will be described with reference to accompanying drawing as follows.

FIG. 1 is an overall flow chart of a method for filtering in ranging of a UAV according to an embodiment of the present disclosure. As shown in FIG. 1, the method in the present disclosure is generally based on a characteristic that velocities of the UAV change continuously during a moving process (for example, a climb, a decline or a horizontal movement). A current velocity of the UAV is obtained via seeking a difference of distances measured by a sonar sensor with respect to time. Then a variance of continuous velocities is calculated and it is determined whether a current distance is valid according to the variance. The general frame of the method is as follows. First, initial distances measured are acquired, i.e. the first distance buffer queue and the first moving velocity buffer queue are determined; secondly, it is determined whether a new distance measured is valid according to the initial distances. If the new distance satisfies a certain condition, the new distance is considered to be valid and the initial distances are updated according to the new distance; if the new distance does not satisfy the certain condition, a distance is estimated and used as the current distance and the initial distances are maintained. When experiencing a series of fail measurements or all the measured distances does not satisfy the certain condition, the initial distances should be re-acquired. It should be noticed that, the ranging described in the present disclosure may be refer to measuring a distance of the UAV relative to the ground via the sonar sensor provided on the bottom of the UAV, but the method according to embodiments of the present disclosure is not limited to measuring the distance relative to the ground, and the method according to embodiments of the present disclosure will be applicable as long as a sonar ranging is using in the UAV.

Figure 2:
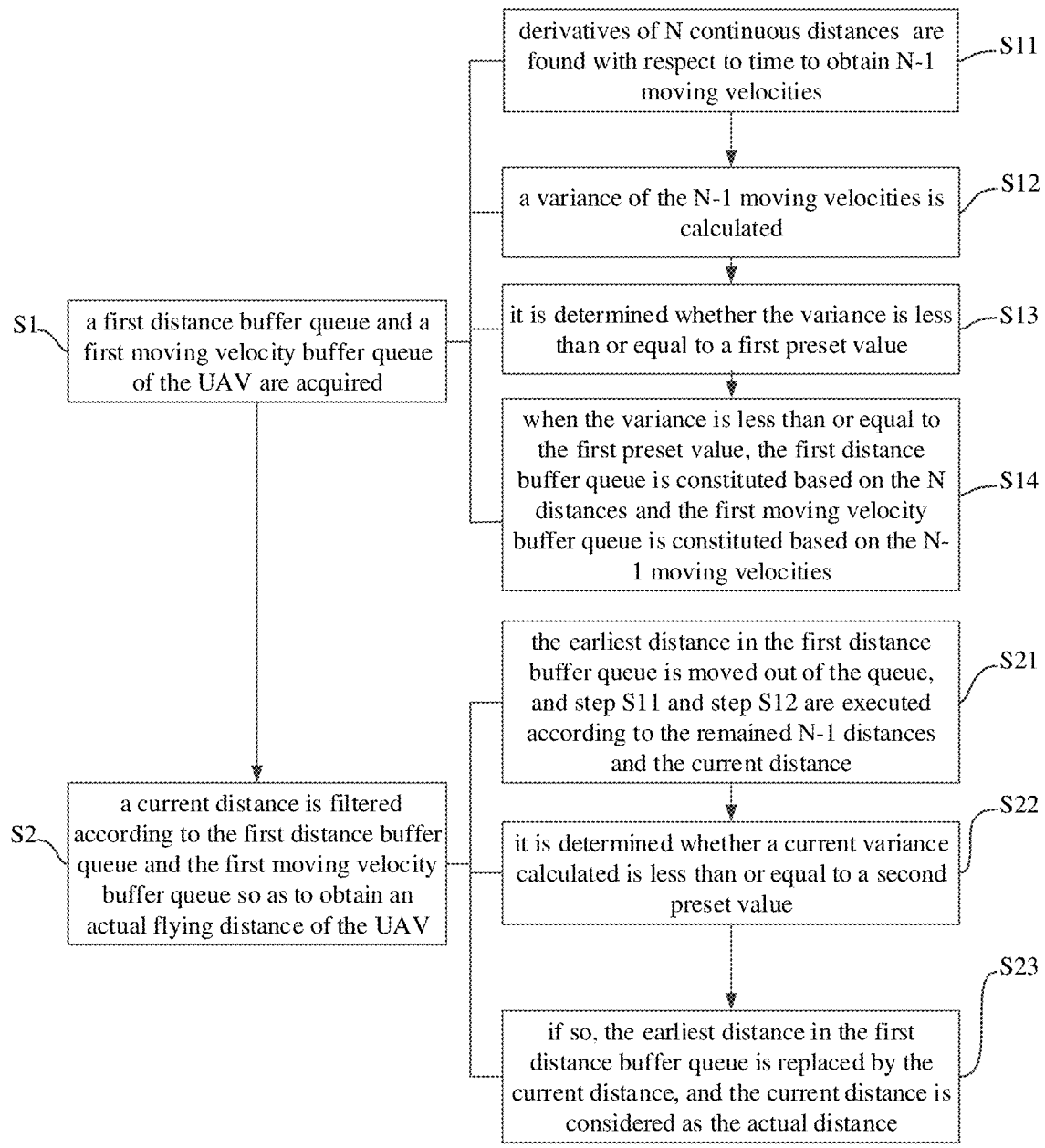
FIG. 2 is a detail flow chart of a method for filtering in ranging of a UAV according to an embodiment of the present disclosure.

FIG. 2 is a detail flow chart of a method for filtering in ranging of a UAV according to an embodiment of the present disclosure. As shown in FIG. 2, the method includes steps S1 and S2.

At step S1, a first distance buffer queue and a first moving velocity buffer queue of the UAV are acquired.

In an embodiment, determining the first distance buffer queue and the first moving velocity buffer queue of the UAV according to the N distances includes: obtaining N−1 moving velocities according to the N distances and calculating a difference level value of the N−1 moving velocities; determining whether each distance is valid according to the difference level value; when each distance is valid, constituting the first distance buffer queue based on the N distances and constituting the first moving velocity buffer queue based on the N−1 moving velocities.

In an embodiment, the difference level value includes a variance, and step S1 may include steps S11, S12, S13 and S14.

At step S11, derivatives of N continuous distances of the UAV measured in a preset time duration via a sonar sensor are found with respect to time to obtain N−1 moving velocities of the UAV.

At step S12, a variance of the N−1 moving velocities is calculated.

At step S13, it is determined whether the variance is less than or equal to a first preset value.

At step S14, when the variance is less than or equal to the first preset value, the first distance buffer queue is constituted based on the N distances and the first moving velocity buffer queue is constituted based on the N−1 moving velocities.

In an embodiment, after step S13, the method may also include: when the variance is greater than the first preset value, moving the first distance (i.e. the earliest distance) in the first distance buffer queue out from the queue and moving a newest distance measured into the first distance buffer queue and returning to step S11 until the variance is less than or equal to the first preset value.

As a specific embodiment, the process of acquiring the first distance buffer queue and the first moving velocity buffer queue will be further illustrated with reference to FIG. 6 as follows.

Figure 6:
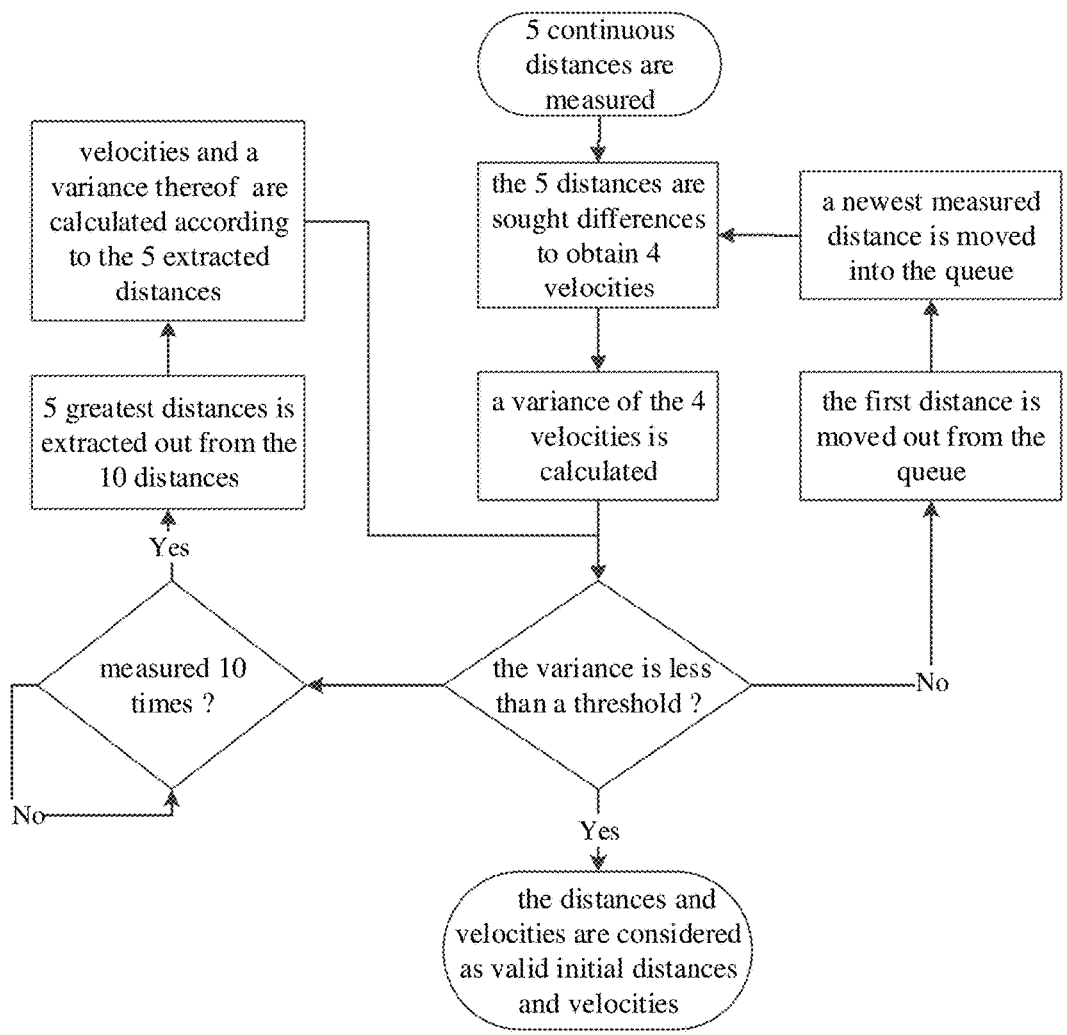
FIG. 6 is a flow chart of a method for acquiring a first distance buffer queue and a first moving velocity buffer queue according to an embodiment of the present disclosure.

With reference to FIG. 6, N is 5 in this embodiment, for example. First, 5 continuous distances may be measured in the order of time to constitute a queue. When there is a failure in measuring, the distance corresponding to the failure is ignored and the measurement goes on until the 5 distances are measured in a preset time duration. When the number of distances measured in the preset time duration is less than 5, earlier distances may be deleted and the measurement goes on from a new time point until the number of the distances accumulates to 5 during the preset time duration. Then, derivatives of the 5 distances are found with respect to time to obtain 4 moving velocities. Then a variance of the 4 moving velocities is calculated. Since the velocities change continuously during a moving process, i.e. there is no step sudden change in the velocities, the variance of velocities in a short time duration may approach to zero. If the variance of the 4 continuous moving velocities is less than or equal to a first preset value T1, it may be assumed that there is no noise in the current 5 measurements i.e. the noise has little effect on the measured data, so the current 5 distances are used as the first distance buffer queue for posterior filtering, and the current 4 velocities are used as the first moving velocity buffer queue for posterior filtering. If the variance of the 4 continuous moving velocities is greater than the first preset value T1, it may be assumed that there is noise in the current 5 measurements, so the earliest (i.e. the first measured) distance is removed from the first distance buffer queue, and a newest distance measured is moved into the first distance buffer queue to update the first distance buffer queue, then derivatives of 5 distances in the updated first distance buffer queue are found with respect to time again to obtain 4 new velocities, and a variance of the 4 new velocities is compared to the first preset value T1. The above acts may be repeated until the variance is less than or equal to T1.

In an embodiment, before step S11, the method may also include: measuring M continuous distances using a sonar ranging method, in which M is greater than N; extracting N greatest distances from the M distances; and determining the first distance buffer queue and the first moving velocity buffer queue according to the N greatest distances. Details of the process will be described in specific embodiments with reference to FIG. 6 as follows.

With reference to FIG. 6, M is 10 in this embodiment, for example.

In a process of implementing the present disclosure, the inventor found that noises usually cause the result smaller than the real distance. No matter the noises cause the result bigger or smaller, as long as there are noises in the measured data, the variance of velocities is relatively great. When determining the initial distances, if the initial distances and velocities cannot be obtained via the method described in the above embodiment with 10 (i.e. M) continuous distance, this means that, out of the 10 measurements, there are less than 5 continuous distances which are correct. Then 5 (i.e. N) greatest data in the 10 (i.e. M) data are selected and processed according to the method described in the above embodiment to obtain the first distance buffer queue and the first moving velocity buffer queue.

In conclusion, there are two ways to determine the first distance buffer queue and the first moving velocity buffer queue in embodiments of the present disclosure. One way is based on 5 (i.e. N) distance data without noise. In practice, this way is more suitable for measuring relatively shorter distance. Another way is based on 5 (i.e. N) maximum distance data selected from 10 (i.e. M) distance data. When there is no noise involved in the 5 greatest distances, the first distance buffer queue and the first moving velocity buffer queue are obtained accordingly, and the 5 distances do not have to be continuous. In practice, this way is more suitable for measuring relatively longer distance. The two methods may be used at the same time, and the first distance buffer queue and the first moving velocity buffer queue may be determined as long as one of the methods to meet the conditions.

At step S2, a current distance is filtered according to the first distance buffer queue and the first moving velocity buffer queue. In an embodiment, as shown in FIG. 2, step S2 may include the following steps.

At step S21, the earliest distance in the first distance buffer queue is moved out from the queue, and step S11 and step S12 are executed according to the remained N−1 distances and the current distance.

At step S22, it is determined whether a current variance calculated is less than or equal to a second preset value.

At step S23, if so, i.e. the current variance calculated is less than or equal to the second preset value, the first distance i.e. the earliest distance in the first distance buffer queue is replaced by the current distance so as to update the first distance buffer queue. That is, the earliest distance in the first distance buffer queue is pushed out and the current measured distance is pushed in the first distance buffer queue. The current distance is considered as the actual distance of the UAV.

Figure 3:
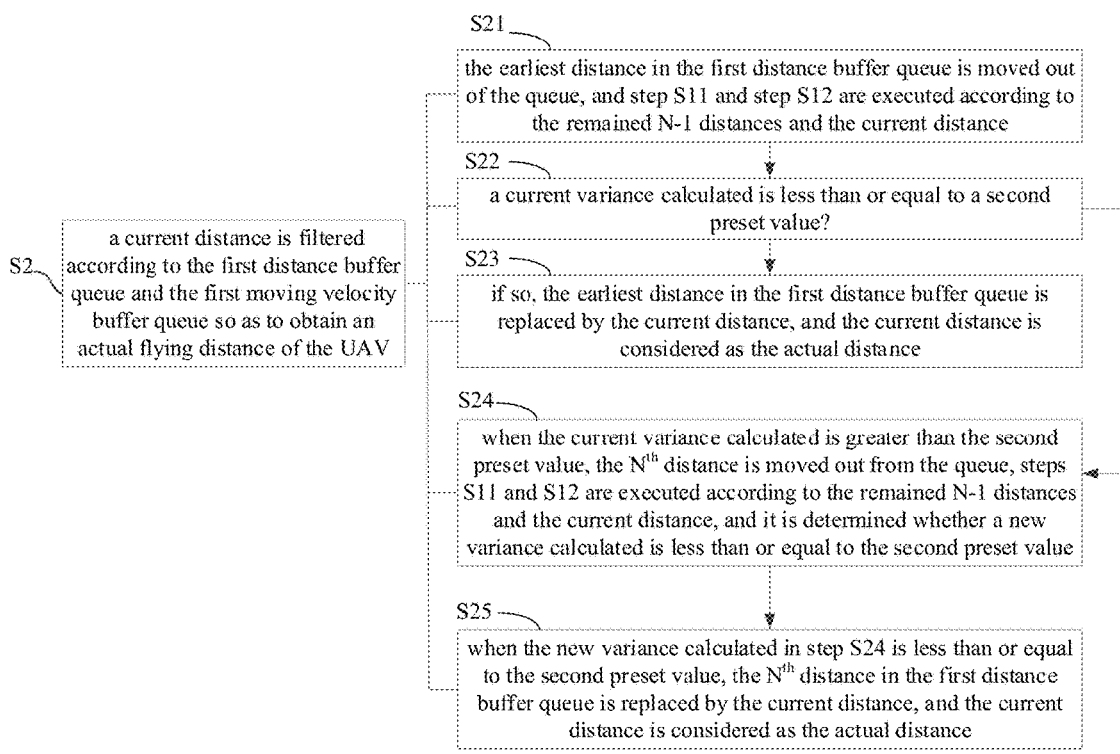
FIG. 3 is a detail flow chart of filtering a current distance according to an embodiment of the present disclosure.

In an embodiment of the present disclosure, as shown in FIG. 3, after step S22, the method further includes following steps.

At step S24, when the current variance calculated is greater than the second preset value, the $N^{th}$ distance i.e. the last distance in the first distance buffer queue is moved out from the queue, step S11 and step S12 are executed according to the remained N−1 distances and the current distance, and it is determined whether a new variance calculated is less than or equal to the second preset value.

At step S25, when the new variance calculated in step S24 is less than or equal to the second preset value, then the $N^{th}$ distance in the first distance buffer queue is replaced by the current distance so as to update the first distance buffer queue, and the current distance is considered as the actual distance of the UAV.

Figure 4:
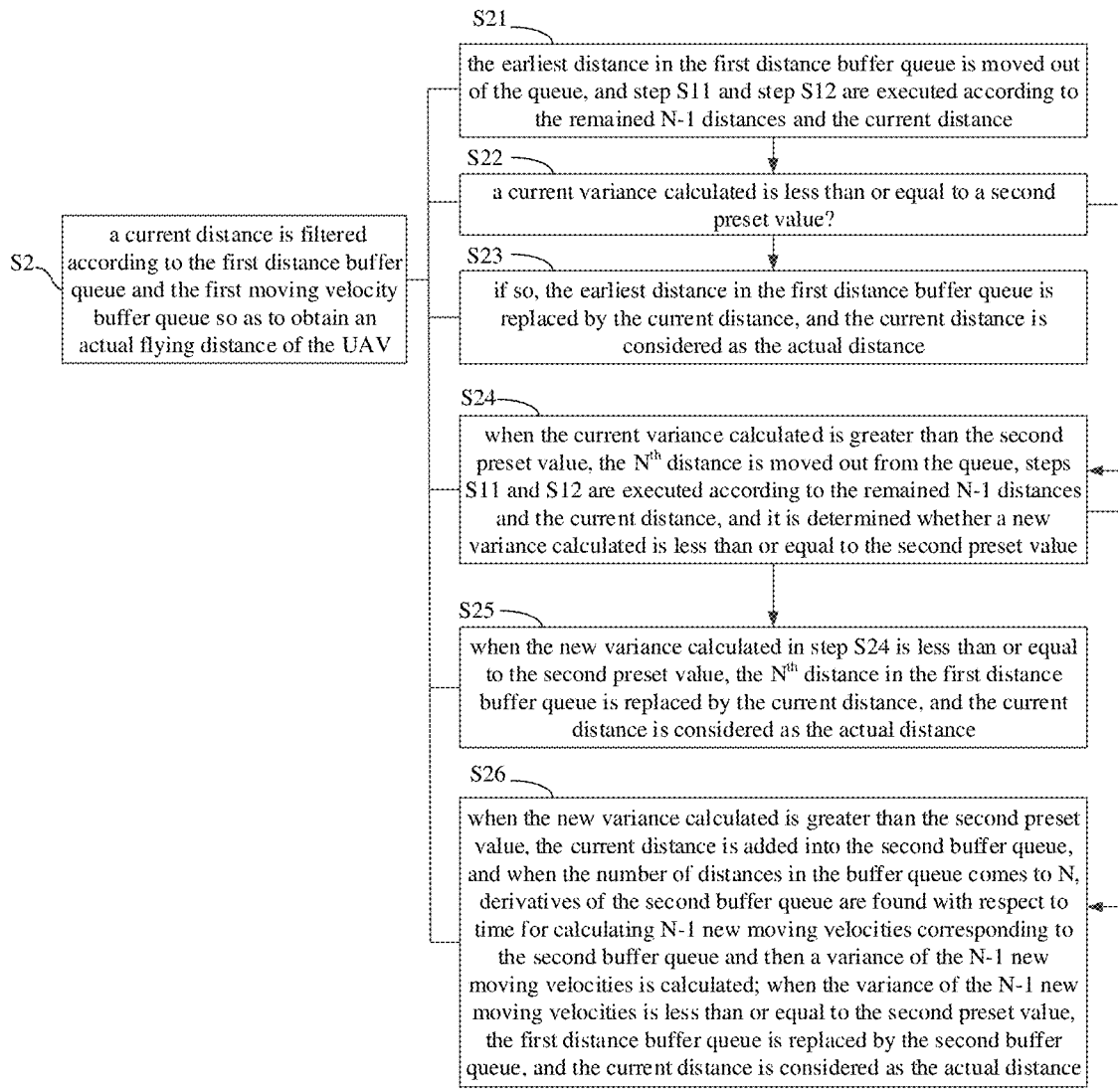
FIG. 4 is a detail flow chart of filtering a current distance according to another embodiment of the present disclosure.

In an embodiment, after step S24, as shown in FIG. 4, the method may further include, for example, following steps.

At step S26, when the new variance calculated is greater than the second preset value, the current distance is added into the second buffer queue, and when the number of distances in the buffer queue comes to N, derivatives of the second buffer queue are found with respect to time for calculating N−1 new moving velocities corresponding to the second buffer queue and then a variance of the N−1 new moving velocities is calculated; when the variance of the N−1 new moving velocities is less than or equal to the second preset value, the first distance buffer queue is replaced by the second buffer queue, and the current distance is considered as the actual distance of the UAV.

Figure 5:
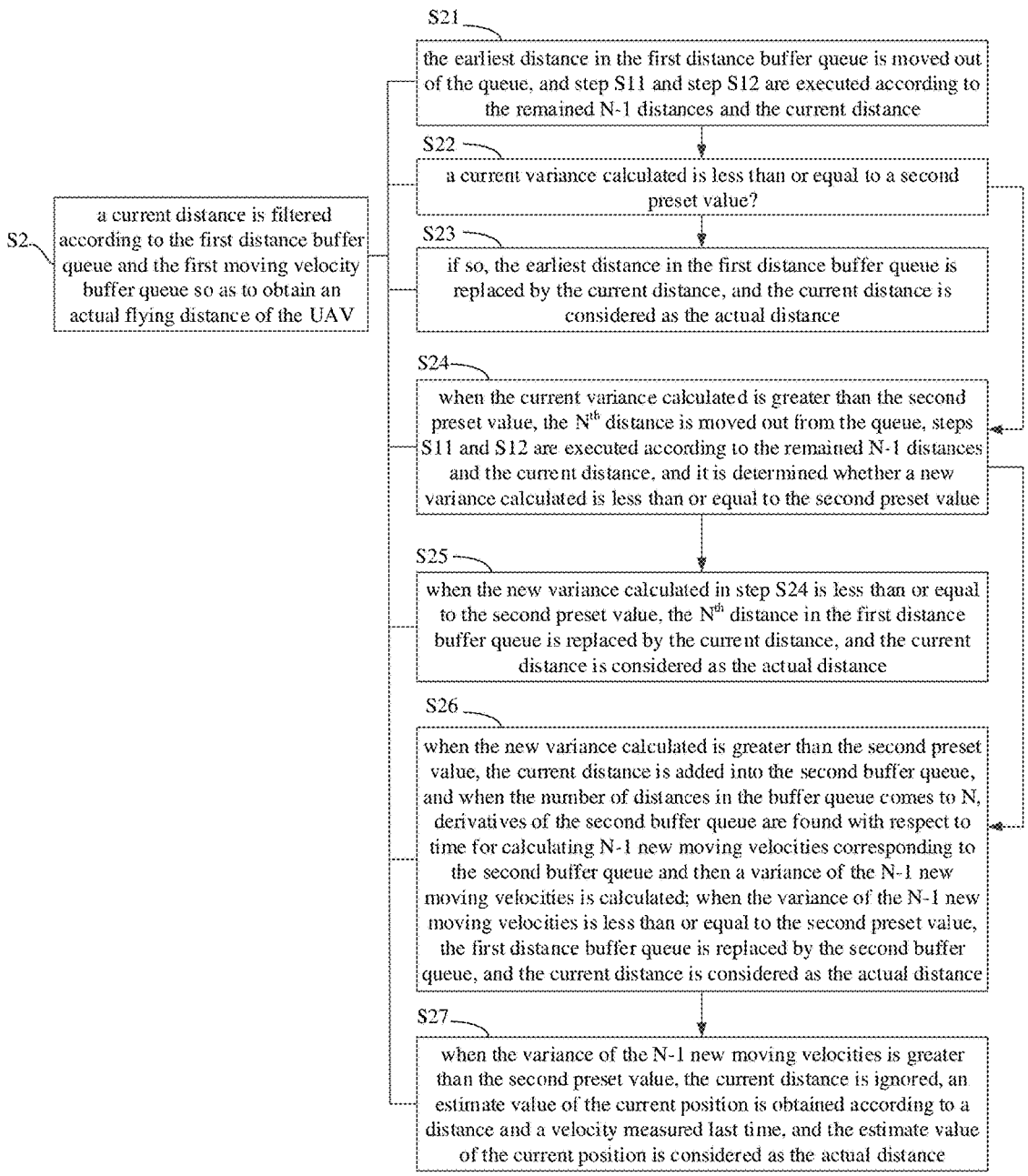
FIG. 5 is a detail flow chart of filtering a current distance according to another embodiment of the present disclosure.

In an embodiment, after step S26, as shown in FIG. 5, the method may further include, for example, following steps.

At step S27, when the variance of the N−1 new moving velocities is greater than the second preset value, the current distance is ignored, an estimate value of the current position is obtained according to a distance and a velocity measured last time, and the estimate value of the current position is considered as the actual distance of the UAV.

In some embodiments, the estimate value of the current position of the UAV is calculated, for example, via a following equation of:

$$d\_new = d\_pre + v\_pre * t,$$

in which, d_new is the estimate value of the current position of the UAV, d_pre is the distance measured last time, v_pre is the velocity measured last time, and t is a time duration from the last time to the current time.

To make the present disclosure easier to appreciate, the process of filtering the current distance according to the above embodiments of the present disclosure will be described in detail in particular embodiments with reference to FIG. 7 and FIG. 8.

Figure 8:
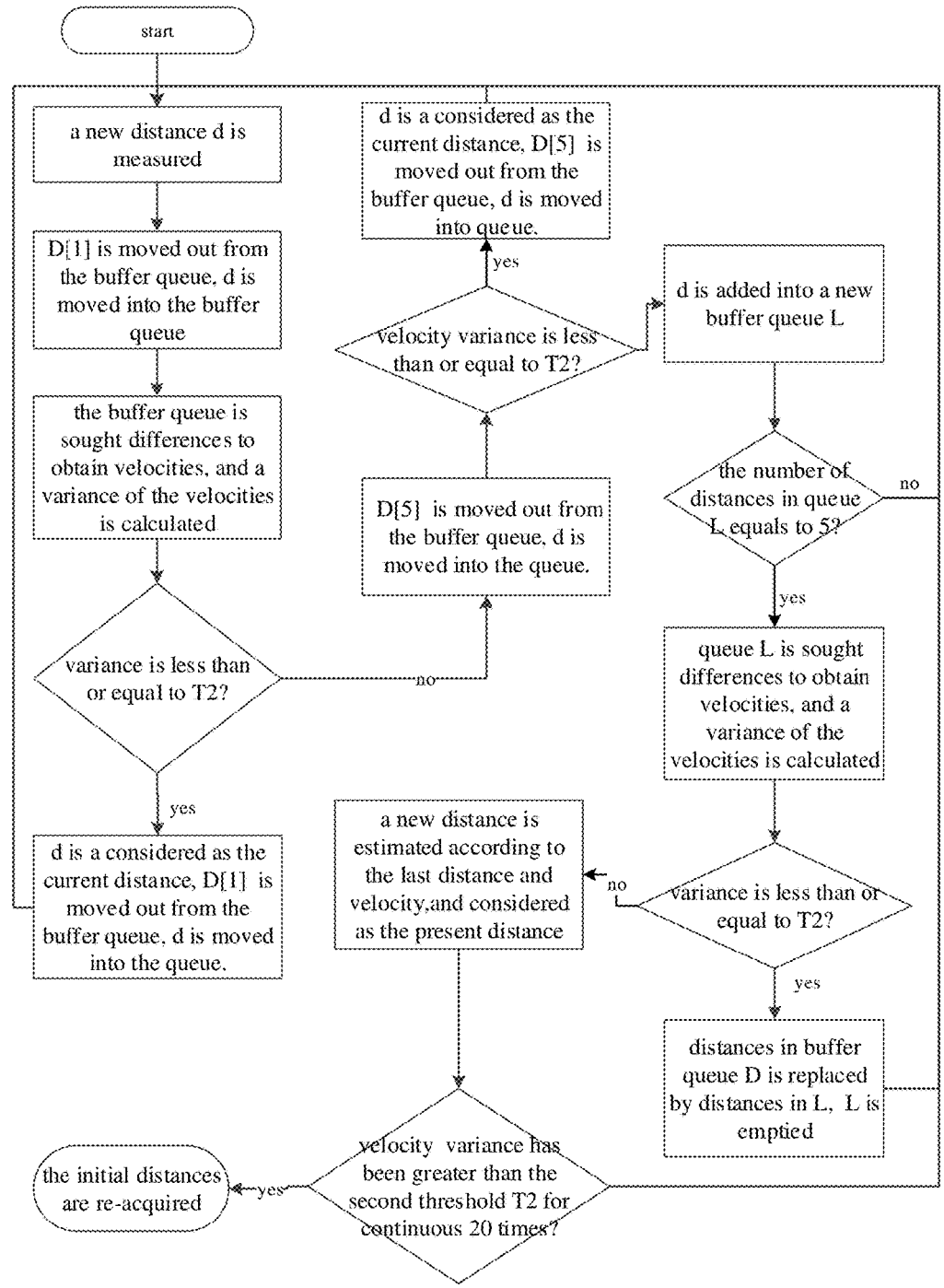
FIG. 8 is a flow chart of a method for filtering a current distance of a UAV according to an embodiment of the present disclosure.

As shown in FIG. 8, the obtained first distance buffer queue is denoted as D including 5 distances D[1], D[2], . . . , D[5] arranged in the order of time. Every time a new (current) distance d is measured, the first distance D[1] in the first distance buffer queue, i. e. the earliest measured buffer data (distance) is moved out from the queue, and the new distance d is added into the queue to form a new queue, then derivatives of the 5 distances in the new queue are found with respect to time to obtain 4 velocities, and a variance of the 4 velocities is calculated.

When the variance is less than or equal to the second preset value, the current i.e. new distance d is valid, d is a considered as the current distance of the UAV, and the buffer queue is updated. When the variance of the 4 velocities is greater than the second current value T2, there are some processes as follows. D[5] in the first distance buffer queue may be a noise, D[5] in the first distance buffer queue is removed from the queue, a new queue is formed by buffer data D[1], D[2], D[3], D[4] and the current distance d, and a variance of velocities corresponding to the new queue is calculated. When the new variance calculated is less than the second preset value T2, D[5] in the first distance buffer queue is replaced by the current distance d so as to update the first distance buffer queue, and d is considered as the current distance of the UAV.

Figure 7:
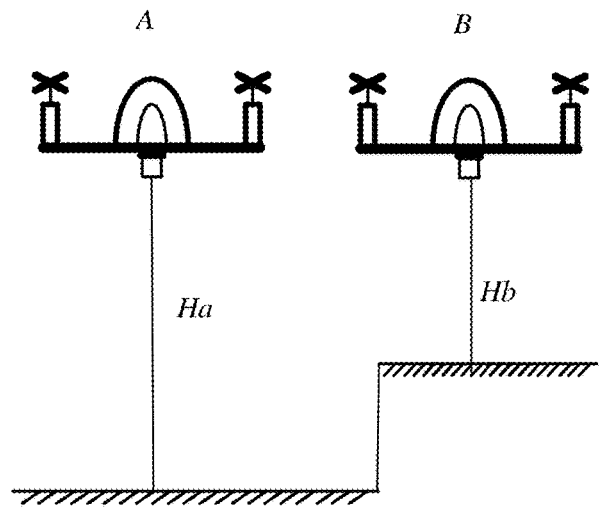
FIG. 7 is a schematic diagram illustrating distances of an UAV relative to ground according to an embodiment of the present disclosure.

When the new variance calculated is still greater than the second preset value T2, then the UAV may be moving from position A to position B, or moving from position B to position A in FIG. 7, for example. Because of the sudden change of the real distance, when a new i.e. current measured distance is added into the first distance buffer queue D, the variance calculated will always be greater than the second preset value T2. Therefore, the new measured distance d is added into a second buffer queue L, and a new position is estimated according to the last measured distance and the last velocity to be considered as the current position of the UAV, a kind of equation for calculation is as follows:

$$d\_new = d\_pre + v\_pre * t \qquad (1)$$

in which, d_new is the estimate value of the current position of the UAV d_pre is the last distance, v_pre is the velocity measured last time, and t is a time duration from the last time to the current time.

Furthermore, when the number of distances in the second buffer queue reaches to 5, derivatives of the distances in the second buffer queue L are found with respect to time and a variance of corresponding velocities is calculated. When the variance calculated is less than the second preset value T2, the distances in the second buffer queue L are copied to the first distance buffer queue D, and the current distance is considered as the current distance of the UAV. When the variance calculated according to the distances in the new buffer L queue and the variance calculated according to the distances in the first distance buffer queue D are both greater than the second preset value T2, the current distance may be a noise, then the current distance is ignored, and a new distance is estimated according to the last measured distance and the last velocity, and considered as the current distance, for example as shown in equation (1). The distances in the first distance buffer queue D are not updated, and L[1] in the second buffer queue L is removed from the queue, the current distance d is added into the queue, the current second buffer queue is equated to a process of relocating the initial position. Once data are added into the first distance buffer queue D, and the variance calculated is less than the second preset value, then the second buffer queue L is emptied, a flow chart of an embodiment is shown in FIG. 8.

In an embodiment of the present disclosure, the method may further includes, the following actions. When the number of continuous failure in measuring distance based on the sonar ranging method is greater than the preset number of times, or the number of continuous measured noises is greater than the preset number, the first distance buffer queue is emptied, and the first distance buffer queue and the first moving velocity buffer queue are re-acquired. With reference to FIG. 8, the preset number of times is, for example, but not limited to, 20. That is to say, when the sonar sensor experiences 20 times continuous failed measurements or the number of continuous measured noises is greater than a preset value, the first distance buffer queue is emptied, and the first distance buffer queue and the first moving velocity buffer queue are re-acquired according to the method described in above embodiments.

In the above embodiments of the present disclosure, two thresholds T1 and T2 of the variance of the velocities are mentioned, in which, the first preset value T1 is a variance threshold for determining the initial position and the initial moving velocity, and the second preset value T2 is a threshold for filtering the current distance by the initial distances. Since the initial position and the initial moving velocity are very important for the posterior filtering in the method, the posterior filtering algorithm will be effective only if the initial position and the initial moving velocity are correct, thus the first preset value T1 is significant. While in an actual process, the height of the UAV may change frequently, or there may be ups and downs on the ground, thus there are fluctuations in the variance of the UAV in a short time duration, but the fluctuations are maintained in a certain range. In an embodiment, the first preset value is determined according to a maximum acceleration of the UAV, a kind of equation for calculation is as follows:

$$T1<(a*t)^2,$$

in which, T1 is the first preset value, a is the maximum acceleration of the UAV, and t is the preset time duration.

In an embodiment, the second preset value T2 is twice as much as the first preset value T1.

Embodiments of the present disclosure also provide an unmanned aerial vehicle.

Figure 9:
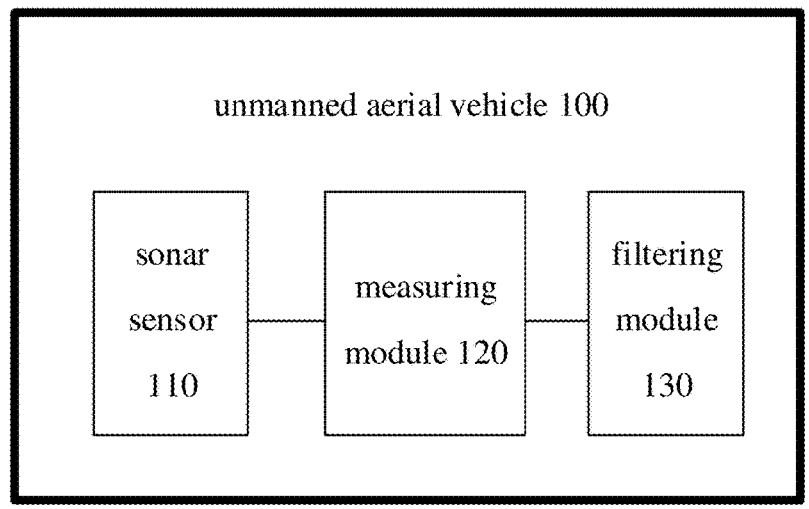
FIG. 9 is a block diagram illustrating a structure of an UAV according to an embodiment of the present disclosure.

FIG. 9 is a block diagram illustrating a structure of an UAV according to an embodiment of the present disclosure. As shown in FIG. 9, the unmanned aerial vehicle 100 includes a sonar sensor 110, a measuring module 120, and a filtering module 130.

The sonar sensor 110 is disposed on the UAV and configured for ranging (i.e. measuring a distance).

The measuring module 120 is configured to acquire a first distance buffer queue and a first moving velocity buffer queue of the UAV.

In an embodiment, the measuring module 120 is configured to acquire the first distance buffer queue and the first moving velocity buffer queue of the UAV according to the N distances by acts of: obtaining N−1 moving velocities according to the N distances and calculating a difference level value of the N−1 moving velocities; determining whether each distance is valid according to the difference level value; when each distance is valid, constituting the first distance buffer queue based on the N distances and constituting the first moving velocity buffer queue based on the N−1 moving velocities.

In detail, the measuring module 120 is configured to find derivatives of N continuous distances measured in a preset time duration via the sonar sensor with respect to time so as to obtain N−1 moving velocities of the UAV; calculate a variance of the N−1 moving velocities; determine whether the variance is less than or equal to a first preset value; and constitute an first distance buffer queue based on the N distances and constitute an first moving velocity buffer queue based on the N−1 moving velocities when the variance is less than or equal to the first preset value.

In an embodiment of the present disclosure, the measuring module 120 is configured to empty the first distance buffer queue, and re-acquire the first distance buffer queue and the first moving velocity buffer queue when the number of continuous failures in measuring distances via the sonar sensor 110 is greater than the preset number of times, or the number of continuous measured noises is greater than the preset number.

In some embodiments, the measuring module 120 is also configured to measure M continuous distances using the sonar sensor 110, in which M is greater than N; extract N greatest distances from the M distances; and obtain the first distance buffer queue and the first moving velocity buffer queue according to the N greatest distances.

The filtering module 130 is configured to filter a present distance according to the first distance buffer queue and the first moving velocity buffer queue to obtain an actual distance of the UAV. In detail, the filtering module 130 is configured to remove the first distance in the first distance buffer queue out from the queue, find derivatives of the N−1 remained distances and the present distance with respect to time to obtain N−1 moving velocities; calculate a first variance of the N−1 moving velocities; determine whether the first variance is less than or equal to a second preset value; and also configured to, when the first variance is less than or equal to the second preset value, replace the first distance in the first distance buffer queue by the present distance so as to update the first distance buffer queue, and consider the present distance as the actual distance of the UAV.

In an embodiment of the present disclosure, the filtering module 130 is also configured to, when the first variance is greater than the second preset value, remove the $N^{th}$ distance in the first distance buffer queue out from the queue, calculate a second variance according to the N−1 remained distances and the present distance, and configured to, when the second variance is less than or equal to a second preset value, replace the $N^{th}$ distance in the first distance buffer queue by the present distance so as to update the first distance buffer queue, and consider the present distance as the actual distance of the UAV.

Furthermore, the filtering module 130 is also configured to, when the second variance is greater than the second preset value, add the present distance into a second buffer queue, and find derivatives of the second buffer queue with respect to time to calculate a variance of N−1 corresponding moving velocities when the number of distances in the second buffer queue comes to N, and configured to, when the variance of the N−1 moving velocities is less than or equal to the second preset value, replace the first distance buffer queue by the second buffer queue, and consider the present distance as the actual distance of the UAV.

Furthermore, the filtering module 130 is also configured to, when the variance of the N−1 moving velocities corresponding to the second buffer queue is greater than the second preset value, ignore the present distance, obtain an estimate value of the present position of the UAV according to a distance and a velocity measured last time, and consider the estimate value of the present position as the actual distance of the UAV.

In an embodiment, the present position of the UAV is calculated via the following equation of:

$$d\_new=d\_pre+v\_pre*t,$$

in which, d_new is the estimate value of the present position of the UAV, d_pre is the distance measured last time, v_pre is the velocity measured last time, and t is a time duration from the last time to the current time.

Furthermore, the filtering module 130 is also configured to, when the variance obtained by the measuring module 120 is greater than the first preset value, move the first distance in the first distance buffer queue out from the queue and move a newest distance into the first distance buffer queue to determine the first distance buffer queue and the first moving velocity buffer queue until the variance is less than or equal to the first preset value.

In an embodiment of the present disclosure, for example, the first preset value is determined according to a maximum acceleration of the UAV, in which, $$T1<(a*t)^2,$$

in which, T1 is the first preset value, a is the maximum acceleration of the UAV, and t is the preset time duration.

In an embodiment, the second preset value is twice as much as the first preset value T1.

It should be noted that since the UAV according to embodiments of the present disclosure may be realized in similar ways with the method for filtering in ranging of a UAV according to the embodiments of the present disclosure, the details may be found with reference to the method parts, and thus will not be elaborated here so as to reduce redundancy.

With the UAV according to embodiments of the present disclosure, the initial distances measured by the sonar sensor are determined first, and then the derivatives of the initial distances are found to obtain the moving velocities of the UAV, and the variance of certain continuous velocities is calculated and it is determined whether the current distance is valid according to the variance, in which when the current distance satisfy a certain condition, the current distance is considered to be valid and the initial distances are updated; and when the current distance does not satisfy the certain condition, a distance is estimated and used as the current distance and the initial distances may be maintained.

Embodiments of the present disclosure also provide a UAV, which includes a sonar sensor disposed on the UAV; a processor; and a memory for storing instructions executable by the processor. The processor is configured to: acquire N continuous distances of the UAV based on the sonar sensor; determine an first distance buffer queue and an first moving velocity buffer queue of the UAV according to the N distances, wherein, N is an integer greater than 2; and filter a current distance of the UAV measured based on the sonar sensor according to the first distance buffer queue and the first moving velocity buffer queue to obtain an actual distance of the UAV.

The processor is further configured to perform the above method for filtering in ranging of an UAV, which is omitted herein.

In addition, the processor of the UAV in embodiments of the present disclosure is configured to perform the followings.

Embodiments of the present disclosure also provide a ranging method based on the method for filtering in ranging of a UAV according to above embodiments of the present disclosure.

Figure 10:
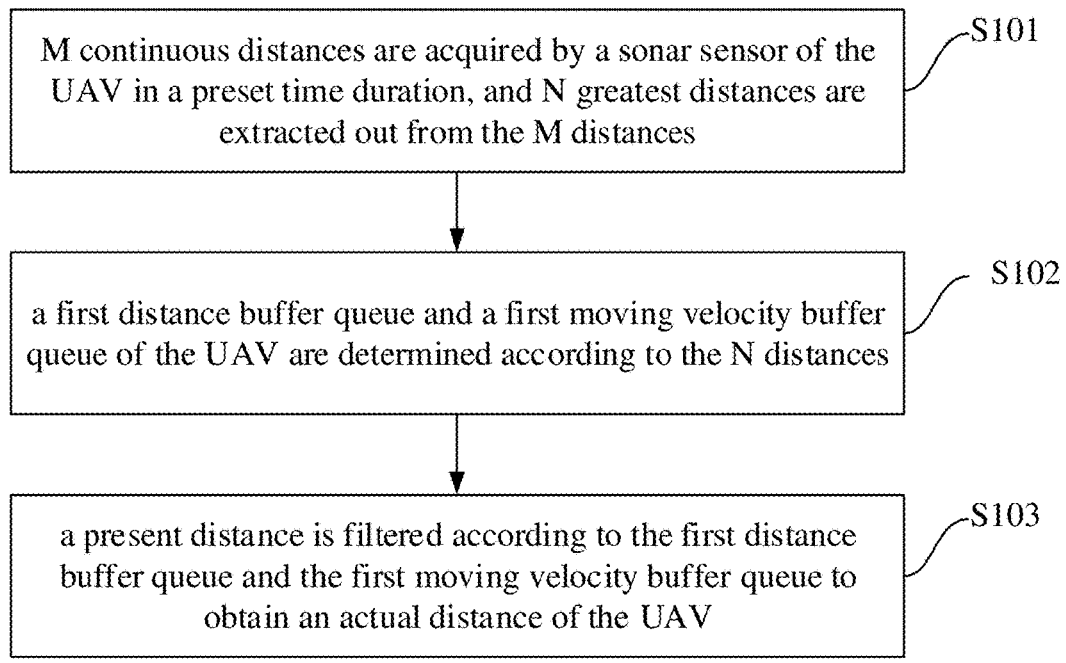
FIG. 10 is a flow chart of a ranging method based on a method for filtering in ranging of a UAV according to an embodiment of the present disclosure.

FIG. 10 is a flow chart illustrating a ranging method based on a method for filtering in ranging of a UAV according to an embodiment of the present disclosure. As shown in FIG. 10, the method includes following steps.

At step S101, M continuous distances are acquired by a sonar sensor of the UAV in a preset time duration, and N greatest distances are extracted out from the M distances, in which, M is greater than N.

At step S102, a first distance buffer queue and a first moving velocity buffer queue of the UAV are determined according to the N distances.

At step S103, a present distance is filtered according to the first distance buffer queue and the first moving velocity buffer queue to obtain an actual distance of the UAV.

It should be understood that, since the ranging method based on a method for filtering in ranging of a UAV according to embodiments of the present disclosure is provided based on the method for filtering in ranging of a UAV according to above embodiments of the present disclosure, the ranging method based on a method for filtering in ranging of a UAV may be realized in similar ways with the method for filtering in ranging of a UAV according to the embodiments of the present disclosure, the details may be found with reference to the descriptions of the method for filtering in ranging of a UAV, and thus will not be elaborated here so as to reduce redundancy.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

In the specification of the present disclosure, it is to be understood that terms such as "upper," "lower," "front," "rear," "left," "right," "top," and "bottom," should be construed to refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for filtering in ranging of an unmanned aerial vehicle UAV, performed in at least one computing device and comprising:
   acquiring N continuous distances of the UAV relative to a surface based on a sonar sensor;
   determining a first distance buffer queue and a first moving velocity buffer queue of the UAV according to the N distances, wherein N is an integer greater than 2;
   filtering a current distance of the UAV measured based on the sonar sensor, according to the first distance buffer queue and the first moving velocity buffer queue, to obtain an actual distance of the UAV;
   wherein filtering the current distance of the UAV measured based on the sonar sensor according to the first distance buffer queue and the first moving velocity buffer queue to obtain the actual distance of the UAV comprises:
      moving the first distance in the first distance buffer queue out, and finding derivatives of the N−1 remaining distances and the current distance with respect to time to obtain N−1 moving velocities;
      calculating a first variance of the N−1 moving velocities;
      determining whether the first variance calculated is less than or equal to a second preset value; and
      when the first variance is less than or equal to the second preset value, replacing the first distance in the first distance buffer queue by the current distance so as to update the first distance buffer queue, and taking the current distance as the actual distance of the UAV.

2. The method according to claim 1, wherein determining the first distance buffer queue and the first moving velocity buffer queue of the UAV according to the N distances comprises:
   obtaining N−1 moving velocities according to the N distances and calculating a difference level value of the N−1 moving velocities;
   when each distance is valid according to the difference level value, constituting the first distance buffer queue based on the N distances and constituting the first moving velocity buffer queue based on the N−1 moving velocities.

3. The method according to claim 2, wherein the difference level value comprises a variance, and determining the first distance buffer queue and the first moving velocity buffer queue of the UAV according to the N distances comprises:
   (S11), finding derivatives of the N continuous distances with respect to time to obtain N−1 moving velocities of the UAV, wherein the N continuous distances are measured in a preset time duration;
   (S12), calculating the variance of the N−1 moving velocities;
   (S14), when the variance is less than or equal to a first preset value, constituting the first distance buffer queue based on the N distances and constituting the first moving velocity buffer queue based on the N−1 moving velocities.

4. The method according to claim 1, wherein after determining whether the first variance is less than or equal to the second preset value, the method further comprises:
   (S24), when the current first variance calculated is greater than the second preset value, moving the $N^{th}$ distance in the first distance buffer queue out, and executing acts (S11) and (S12) according to the remained N−1 distances and the current distance to obtain a second variance; and determining whether the second variance calculated is less than or equal to the second preset value;

(S25), when the second variance calculated is less than or equal to the second preset value, replacing the $N^{th}$ distance in the first distance buffer queue by the current distance so as to update the first distance buffer queue, and taking the current distance as the actual distance of the UAV.

5. The method according to claim 4, wherein, after act (S24), the method further comprises:

(S26), when the current second variance calculated is greater than the second preset value, adding the current distance into a second buffer queue, and when the number of distances in the second buffer queue comes to N, finding derivatives of the second buffer queue with respect to time to obtain N−1 new moving velocities and calculating a variance of the N−1 new moving velocities; when the variance of the N−1 new moving velocities is less than or equal to the second preset value, replacing the first distance buffer queue by the second buffer queue, and taking the current distance as the actual distance of the UAV.

6. The method according to claim 5, wherein, after act (S26), the method further comprises:

(S27), when the variance of the N−1 new moving velocities is greater than the second preset value, ignoring the current distance, and calculating an estimate value of a current position of the UAV according to a distance and a velocity measured last time, and taking the estimate value of the current position as the actual distance of the UAV.

7. The method according to claim 3, wherein the first preset value is determined according to a maximum acceleration of the UAV.

8. The method according to claim 7, wherein the second preset value is twice as much as the first preset value.

9. The method according to claim 3, wherein before act (S11), the method further comprises:

measuring M continuous distances based on the sonar sensor, wherein, M is greater than N;

extracting N greatest distances from the M distances, and obtaining the first distance buffer queue and the first moving velocity buffer queue according to the N greatest distances.

10. An unmanned aerial vehicle UAV, comprising:
a sonar sensor;
a processor; and
a memory for storing instructions executable by the processor, wherein the processor is configured to:
acquire N continuous distances of the UAV relative to a surface based on the sonar sensor;
determine a first distance buffer queue and a first moving velocity buffer queue of the UAV according to the N distances, wherein N is an integer greater than 2; and
filter a current distance of the UAV measured based on the sonar sensor according to the first distance buffer queue and the first moving velocity buffer queue, to obtain an actual distance of the UAV;
wherein the processor is configured to filter the current distance of the UAV measured based on the sonar sensor according to the first distance buffer queue and the first moving velocity buffer queue to obtain the actual distance of the UAV by acts of:
moving the first distance in the first distance buffer queue out, and finding derivatives of the N−1 remaining distances and the current distance with respect to time to obtain N−1 moving velocities;
calculating a first variance of the N−1 moving velocities;
determining whether the first variance calculated is less than or equal to a second preset value; and
when the first variance is less than or equal to a second preset value, replacing the first distance in the first distance buffer queue by the current distance so as to update the first distance buffer queue, and taking the current distance as the actual distance of the UAV.

11. The unmanned aerial vehicle according to claim 10, wherein the processor is configured to determine the first distance buffer queue and the first moving velocity buffer queue of the UAV according to the N distances by acts of:

obtaining N−1 moving velocities according to the N distances and calculating a difference level value of the N−1 moving velocities;

when each distance is valid according to the difference level value, constituting the first distance buffer queue based on the N distances and constituting the first moving velocity buffer queue based on the N−1 moving velocities.

12. The unmanned aerial vehicle according to claim 11, wherein the difference level value comprises a variance, and the processor is configured to determine the first distance buffer queue and the first moving velocity buffer queue of the UAV according to the N distances by acts of:

(S11), finding derivatives of the N continuous distances with respect to time to obtain N−1 moving velocities of the UAV, wherein the N continuous distances are measured in a preset time duration;

(S12), calculating the variance of the N−1 moving velocities;

(S14), when the variance is less than or equal to a first preset value, constituting the first distance buffer queue based on the N distances and constituting the first moving velocity buffer queue based on the N−1 moving velocities.

13. The unmanned aerial vehicle according to claim 10, wherein the processor is further configured to perform acts of:

(S24), when the first variance calculated is greater than the second preset value, moving the $N^{th}$ distance in the first distance buffer queue out, and executing acts (S11) and (S12) according to the remained N−1 distances and the current distance to obtain a second variance; and determining whether the second variance calculated is less than or equal to the second preset value;

(S25), when the second variance calculated is less than or equal to the second preset value, replacing the $N^{th}$ distance in the first distance buffer queue by the current distance so as to update the first distance buffer queue, and taking the current distance as the actual distance of the UAV.

14. The unmanned aerial vehicle according to claim 13, wherein the processor is further configured to perform acts of:

(S26), when the second variance calculated is greater than the second preset value, adding the current distance into a second buffer queue, and when the number of distances in the second buffer queue comes to N, finding derivatives of the second buffer queue with respect to time to obtain N−1 new moving velocities and calculating a variance of the N−1 new moving velocities; when the variance of the N−1 new moving velocities is less than or equal to the second preset value, replacing the first distance buffer queue by the second buffer queue, and taking the current distance as the actual distance of the UAV.

15. The unmanned aerial vehicle according to claim 14, wherein the processor is further configured to perform acts of:
   (S27), when the variance of the N−1 new moving velocities is greater than the second preset value, ignoring the current distance, and calculating an estimate value of a current position of the UAV according to a distance and a velocity measured last time, and taking the estimate value of the current position as the actual distance of the UAV.

16. The unmanned aerial vehicle according to claim 12, wherein,
   the first preset value is determined according to a maximum acceleration of the UAV.

17. The unmanned aerial vehicle according to claim 16, wherein, the second preset value is twice as much as the first preset value.

18. The unmanned aerial vehicle according to claim 12, wherein the processor is further configured to perform acts of:
   measuring M continuous distances based on the sonar sensor, wherein M is greater than N;
   extracting N greatest distances from the M distances, and obtaining the first distance buffer queue and the first moving velocity buffer queue according to the N greatest distances.

* * * * *